May 10, 1966 A. J. SHALER 3,249,964
PRODUCING DENSE ARTICLES FROM POWDERED
CARBON AND OTHER MATERIALS
Filed Sept. 9, 1963

INVENTOR.
AMOS J. SHALER.
BY
Brown, Critchlow, Flick & Peckham.
ATTORNEYS.

United States Patent Office 3,249,964
Patented May 10, 1966

3,249,964
PRODUCING DENSE ARTICLES FROM POWDERED CARBON AND OTHER MATERIALS
Amos J. Shaler, State College, Pa., assignor to Stackpole Carbon Company, St. Marys, Pa., a corporation of Pennsylvania
Filed Sept. 9, 1963, Ser. No. 307,701
10 Claims. (Cl. 18—5)

This invention relates to articles molded from powered materials, and more particularly to apparatus for greatly increasing the density of such articles.

It is common practice to mold articles from powders by pressing or extruding. Metal articles are formed in this way from powdered metals that are sintered after being shaped. Carbon products are baked after molding. Both sintering and baking will be referred to herein as baking. In making carbon articles, the powdered carbon filler and a carbonaceous binder first are mixed together and then molded. When the molded articles are baked these materials decompose, releasing carbonaceous and other gases consisting mainly of carbon, hydrogen, sulfur, oxygen and nitrogen in various molecular combinations. As these gases escape, the article becomes porous, which is detrimental to it in several ways. The loss of the carbon originally present in the binder may exceed 50%. Some volatile material also escapes from the filler itself.

Various attempts have been made to reduce the porosity of such articles, but none of them has been entirely successful. In reducing porosity, not only should the loss of carbon be reduced, but it should be done without preventing the other gases from escaping. In carbon products that are to be heat treated to the very high temperature needed to convert them to graphite, the pores left by the liberated gases can be reduced in size or closed by mechanically working the articles at temperatures between 2600° and 3000° C., but products that are not to be graphitized cannot be heated to a sufficiently high temperature to permit them to be worked. Other methods that have been tried either are very costly or only partly successful, and all methods leave sufficient gross porosity here and there in the product to serve as fracture-generating flaws so that the mechanical and other properties vary from place to place in each piece, from piece to piece in a batch, and from batch to batch.

It is among the objects of this invention to provide apparatus which produces denser articles of powdered materials than has been possible heretofore, which compresses the articles at the same time that they are baked, which is simple in construction, and which is easy and inexpensive to use.

The invention is illustrated in the accompanying drawings, in which

Figure 1:
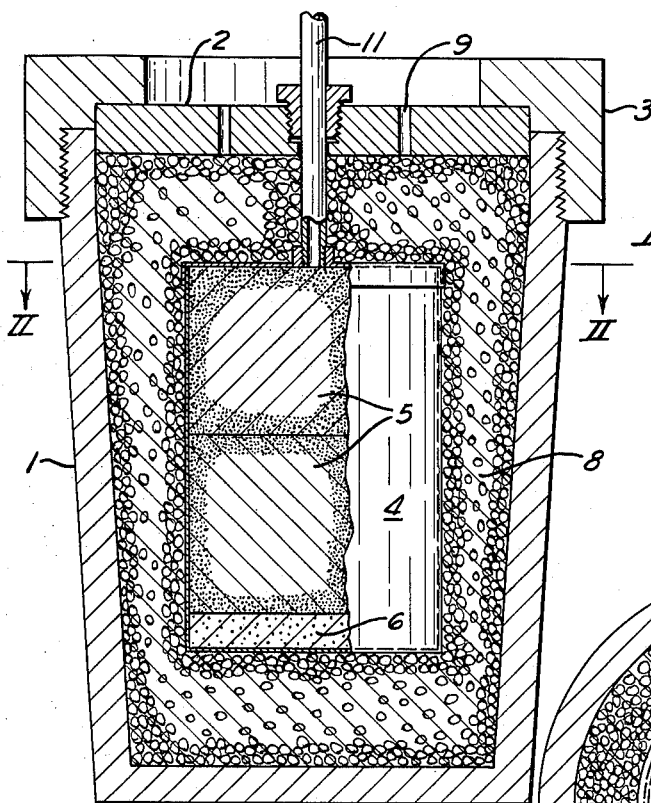
Figure 2:
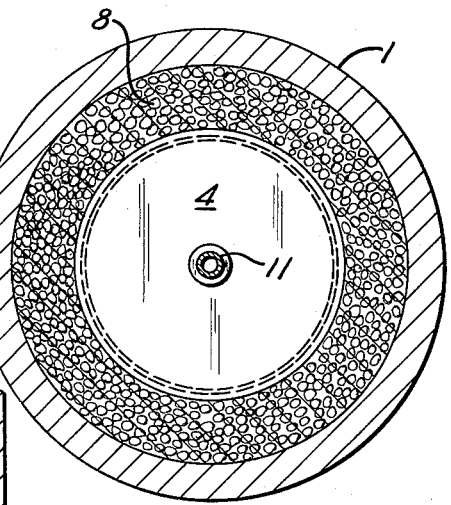
Figure 3:
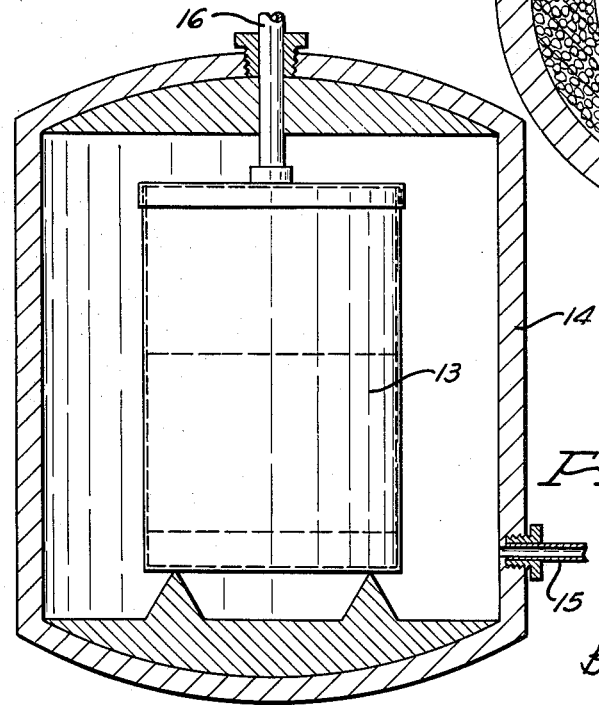

FIG. 1 is a vertical section through my apparatus;
FIG. 2 is a cross-section taken on the line II—II of FIG. 1; and
FIG. 3 is a vertical section through a modification.

Referring to FIGS. 1 and 2 of the drawings, a rigid outer container that is strong enough to resist without deformation the high pressures that will be encountered may be formed in any suitable manner, such as from an open top receptacle 1, the top of which can be closed by a cover plate 2 held by a clamping ring 3 screwed onto the receptacle. Inside of this container and spaced from all of its surfaces is a closed metal can 4, which has very thin walls that are easily flexed so that it can be compressed by external pressure applied to it. The article or articles 5 molded from powdered material and that are to be baked are placed in this can. For greatest efficiency, there should be as little open space as possible around those articles. If the molded material will liberate volatile products when heated, a porous metallic getter is also placed in the can to form the volatiles into solid compounds. The getter may be a pressed and sintered porous disc 6, or it may be loose material packed around the material that is to be baked.

The space surrounding the can is filled with a porous body 8 of thermally expansible granular material, which has a coefficient of expansion that is much greater than that of the rigid container. When this apparatus is placed in an oven or the like to bake the articles inside the can, the heat causes the porous body to expand. Since the rigid container prevents outward expansion of the body, it must expand inwardly and therefore it contracts forcefully on the can and compresses it from all directions to compress the molded articles inside of the can.

Tungsten is preferred as the material for the container because of its low coefficient of expansion, but molybdenum, stainless steel and other metals could be used. For the expansible material of the porous body 8, hafnium is preferred because of its high coefficient of expansion, but here again other materials could be used if sufficient quantities are employed. For example, a high-alloy steel, cobalt, nickel, a nickel alloy or one of the superalloys could be used.

This apparatus can be used advantageously with molded metal products even if gases are not liberated during baking, because during sintering of such articles they can be compressed more than was possible before sintering. However, this invention is especially applicable to the compressing of molded powdered carbon products. In such a case the can 4 is made of palladium, because that metal is pervious to the hydrogen that is liberated from the articles being baked. Of course, the closed can prevents carbon from escaping in the form of gas and making the baking articles still more porous. The other volatiles, such as oxygen, nitrogen and sulfur, will be taken up by the getter and converted into solid compounds. The hydrogen that escapes through the walls of the palladium can passes up through the porous hafnium and escapes from the container through one or more outlets 9 in the cover plate. The pores left in the carbon article by the liberated gases are closed by the great pressure exerted against the article from all directions by the thin can as the heated hafnium expands inwardly against it.

During the baking and compressing, carbon can actually be added to the product, if desired, by introducing a carbon gas into the can under pressure through a pipe 11 extending down through the top of the container and the top of the can, in which the pipe is sealed. This will add carbon to whatever minute spaces may remain in the product, with the result that the finished product is solid and dense.

Instead of using a thermally expansible material between the flexible can and the rigid container, that space may be filled with a fluid that is put under high pressure to compress the can. Thus, as shown in FIG. 3, a palladium can 13 may be supported in a rigid container 14, spaced from the walls thereof. Into the space between them a fluid under great pressure is introduced through a pipe 15 to compress the can on the carbon articles being baked in it. Carbon gas can be injected into the can at the same time through a pipe 16. The hydrogen liberated from the carbon articles will escape through the walls of the palladium can and into the fluid.

I claim:

1. Compressing apparatus for producing dense articles molded from powdered materials, comprising a closed compressible metal can, a rigid container surrounding the can and spaced therefrom, and a porous body of thermally expansible granular material filling the space between the container and can and having a coefficient of expansion much greater than that of the container and capable during expansion of compressing the can, whereby when the apparatus is heated to bake a molded powdered article fitting in the can said porous body will expand inwardly to contract on the can to compress it against said article to compress the article.

2. Comprising apparatus according to claim 1, including a getter in said can for gases liberated from said article when it is heated.

3. Compressing apparatus according to claim 1, in which said can is made of palladium when said article liberates hydrogen during baking.

4. Compressing apparatus according to claim 1, in which said granular material is hafnium.

5. Compressing apparatus according to claim 1, in which said container is made of tungsten.

6. Compressing apparatus for producing dense carbon articles molded from powdered carbon and a carbonaceous binder, comprising a closed compressible palladium can, a getter therein for oxygen and nitrogen and sulfur, a rigid container surrounding said can and spaced therefrom and provided with a hydrogen outlet, and a porous body of thermally expansible granular material filling the space between the container and can and having a coefficient of expansion much greater than that of the container and capable during expansion of compressing the can, whereby when the apparatus is heated to bake a carbon article fitting in the can liberated hydrogen will escape through the can and liberated oxygen and nitrogen and sulfur will react with the getter while said porous body expands inwardly to contract on the can and compress it against the carbon article to compress the article.

7. Compressing apparatus according to claim 6, in which said granular material is hafnium.

8. Compressing apparatus according to claim 6, in which said granular material is hafnium and said container is made of tungsten.

9. Compressing apparatus according to claim 6, in which said can is provided with an inlet, and a conduit extends through said container and porous body and is connected to said inlet for delivering to the inside of the can a fluid carbon compound adapted to decompose inside the can during said baking.

10. Compressing apparatus for producing dense carbon articles molded from powdered carbon and a carbonaceous binder, comprising a closed compressible palladium can, a getter therein for oxygen and nitrogen and sulfur, a rigid container surrounding said can and spaced therefrom and provided with a hydrogen outlet, whereby when the apparatus is heated to bake a carbon article fitting in the can liberated hydrogen will escape through the can and liberated oxygen and nitrogen and sulfur will react with the getter, and means filling the space between the container and can adapted to exert pressure inwardly during said heating for compressing the can against the carbon article to compress the article.

References Cited by the Examiner

UNITED STATES PATENTS

| | | | |
|---|---|---|---|
| 2,400,094 | 5/1946 | Benning | 264—127 |
| 2,990,583 | 7/1961 | Barbera. | |
| 3,011,043 | 11/1961 | Zeitlin et al. | |
| 3,037,652 | 6/1962 | Wallace | 264—45 XR |

J. SPENCER OVERHOLSER, *Primary Examiner.*

M. V. BRINDISI, *Examiner.*

M. L. McBAY, *Assistant Examiner.*